US011474419B2

(12) United States Patent
Tippin

(10) Patent No.: US 11,474,419 B2
(45) Date of Patent: Oct. 18, 2022

(54) MODULAR PROJECTION SYSTEMS AND METHODS OF USING SAID SYSTEMS

(71) Applicant: FIVE-STAR AUDIOVISUAL, INC., Naperville, IL (US)

(72) Inventor: Robert Tippin, Naperville, IL (US)

(73) Assignee: FIVE-STAR AUDIOVISUAL, INC., Naperville, IL (US)

( * ) Notice: Subject to any disclaimer, the term of this patent is extended or adjusted under 35 U.S.C. 154(b) by 0 days.

(21) Appl. No.: 17/012,217

(22) Filed: Sep. 4, 2020

(65) Prior Publication Data

US 2021/0072626 A1 Mar. 11, 2021

Related U.S. Application Data

(60) Provisional application No. 62/896,922, filed on Sep. 6, 2019.

(51) Int. Cl.
*G03B 21/10* (2006.01)
*G03B 21/16* (2006.01)
*G03B 21/60* (2014.01)

(52) U.S. Cl.
CPC ............. *G03B 21/10* (2013.01); *G03B 21/16* (2013.01); *G03B 21/60* (2013.01)

(58) Field of Classification Search
CPC ........ G03B 21/10; G03B 21/16; G03B 21/56; G03B 21/60
See application file for complete search history.

(56) References Cited

U.S. PATENT DOCUMENTS

| 7,537,184 | B1* | 5/2009 | Basilicata | G03B 21/54 248/123.11 |
| 8,919,966 | B2* | 12/2014 | Falendysz | G03B 21/14 248/125.8 |
| 2002/0131024 | A1* | 9/2002 | Keenan | F16M 11/048 353/79 |
| 2007/0171383 | A1* | 7/2007 | Deves | G03B 21/54 353/79 |
| 2012/0162870 | A1* | 6/2012 | MacDonald | G03B 21/30 361/679.01 |
| 2015/0029473 | A1* | 1/2015 | Derks | G03B 21/145 353/79 |
| 2015/0076311 | A1* | 3/2015 | Håkansson et al. | F16M 11/42 248/422 |
| 2015/0358574 | A1* | 12/2015 | Henion | A63G 31/00 349/5 |
| 2017/0264864 | A1* | 9/2017 | McNelley | H04N 7/15 |

FOREIGN PATENT DOCUMENTS

DE  102011086498 A1 *  5/2013  ............. G03B 21/16

* cited by examiner

*Primary Examiner* — Magda Cruz
(74) *Attorney, Agent, or Firm* — Cook Alex Ltd.

(57) ABSTRACT

A projection system can include a projector, a screen, a spine, a base, a projector shroud, and a shelf. In some embodiments the spine is made of steel piping. In some embodiments, the spine is hollow and can accommodate a first cable. In some embodiments the screen is an ALR screen. In some embodiments, the system utilizes an ultra-short throw projector lens. In some embodiments, the base is a steel plate. In some embodiments, the projector system includes a counterbalance. In some embodiments, the projector shroud and/or shelf is/are configured to increase ventilation and/or act as heat sink(s). In some embodiments, the projection system includes a remote-control extender.

18 Claims, 9 Drawing Sheets

MODULAR PROJECTION SYSTEMS AND METHODS OF USING SAID SYSTEMS

CROSS-REFERENCE TO RELATED APPLICATIONS

This application claims priority benefits from U.S. provisional patent application No. 62/896,922 filed on Sep. 6, 2019, entitled "Apparatus and Methods for Audiovisual Presentation". The '922 application is incorporated by reference herein in its entirety.

FIELD OF THE INVENTION

The present invention relates to audiovisual equipment and, in particular, to equipment suitable for projecting video from a digital source onto a screen.

When audiovisual (AV) equipment is required for a conference or seminar, the equipment usually includes a projector and a screen. In conventional audiovisual equipment setups, the projector is typically mounted on a stationary table, a wheeled cart, or on a permanent frame with power cords and interconnecting cables running to and from the projector. The presenter is typically delivering the presentation from a portable computer (e.g., a laptop or a tablet computer) connected by a cord to the projector. Besides the cord connecting the computer to the projector, the laptop oftentimes requires recharging from a charger that must be connected to a wall or floor outlet. In many cases, to conceal the cords or to keep people from tripping, duct tape, a hollow floor runner or some other type of temporary covering is used to shroud the cords.

In some audiovisual setups, the screen is mounted on a tripod, or other suitable stand, that supports the screen from the bottom. In other audiovisual setups, the screen is suspended on a framework formed of exposed trusses or other structural members.

When an elegant and professional environment is desired, presenters may wish to use an audiovisual equipment setup that is at least partially integrated and can hide from the audience at least some of the equipment, cabling, and/or cords.

In at least some embodiments, presenters may wish to use an audiovisual equipment setup that can be adjusted to suit the size of the room in which the presentation is being given, and, in particular, to suit the height of the ceiling. For example, raising the screen closer to the ceiling can provide audience members with a clearer view of an image on the screen.

The apparatuses and methods described in the present application include a modular, integrated projection system with adjustable screen height. Adjusting the screen height to suit the ceiling height and/or dimensions of the room in which the audiovisual equipment is to be used can provide an improved experience for the audience.

In at least some embodiments, the apparatuses can have functional features that facilitate the setup of the audiovisual equipment, assist the users of the equipment during their presentations, and/or provide conference participants with an environment that is conducive to effective learning and interactions with the presenters.

SUMMARY OF THE INVENTION

A projection system can include a projector, a screen, a spine, a base, a projector shroud, and a shelf. In some embodiments the spine is made of steel piping. In some embodiments, the spine is hollow and can accommodate a first cable. In some embodiments the screen is an ambient light rejection (ALR) screen. In some embodiments, the system utilizes an ultra-short throw projector lens. In some embodiments, the base is a steel plate. In some embodiments, the projector system includes a counterbalance. In some embodiments, the projector shroud and/or shelf is/are configured to increase ventilation and/or act as heat sink(s). In some embodiments, the projection system includes a remote-control extender.

In some embodiments, the spine of the projection system has an arm to hold a shelf at a given horizontal distance from the screen. In some embodiments, the ratio of the given horizontal distance to the width of the screen is under 0.4.

DETAILED DESCRIPTION OF ILLUSTRATED EMBODIMENT(S)

Figure 1A:
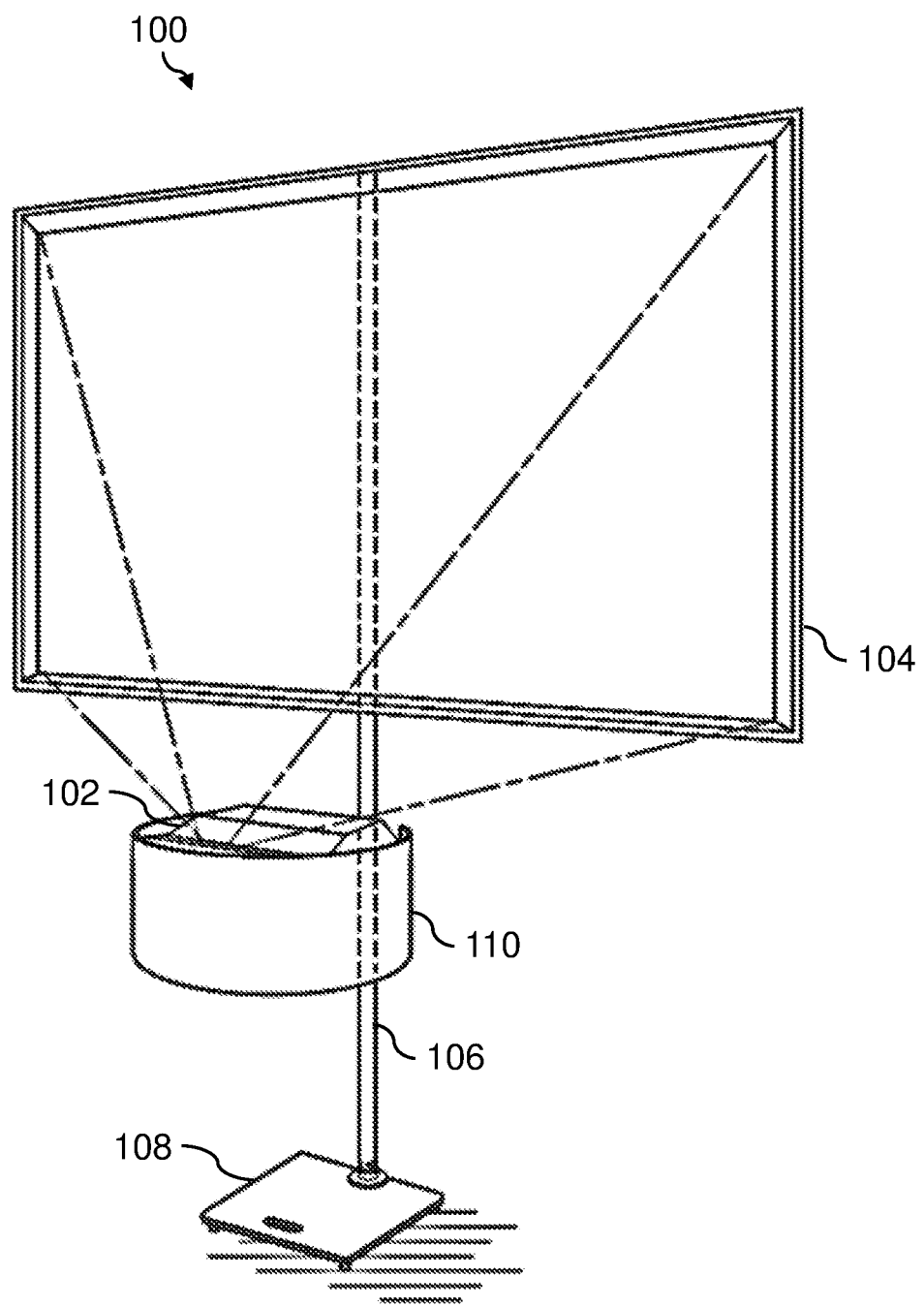
FIG. 1A is a front perspective view of a projection system.

Certain specific details are set forth below in order to provide a thorough understanding of various disclosed embodiments and implementations. However, embodiments and implementations can be practiced without one or more of these specific details, or with other methods, components, materials, etc. In other instances, known structures associated with projection systems (including, but not limited to, projectors, projector stands, screens, computers, cabling, cords, and remote controls), have not been shown or described in detail to avoid unnecessarily obscuring descriptions of the embodiments.

In the drawings, identical reference numbers identify similar elements or acts. The sizes and relative positions of elements in the drawings are not necessarily drawn to scale. For example, the shapes of various elements and angles are not necessarily drawn to scale, and some of these elements can be arbitrarily enlarged and positioned to improve drawing legibility.

Reference throughout this specification to "one embodiment" or "an embodiment", or to "one implementation" or "an implementation" means that a particular feature, structure or characteristic described in connection with the embodiment or implementation is included in at least one embodiment or implementation. Thus, the appearances of the phrases "in one embodiment" or "in an embodiment", or "in one implementation" or "in an implementation" in various places throughout this specification are not necessarily all referring to the same embodiment or implementation. Furthermore, the particular features, structures, or characteristics can be combined in any suitable manner in one or more embodiments or implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments or implementations.

Short-Throw and Ultra-Short-Throw Projection Systems

In the present application, the term "throw" refers to a distance between a projector lens and a screen, and "throw ratio" T is defined as a ratio of a distance d between the projector lens and the screen, and a dimension w of the screen (e.g., a width of the screen), i.e., T=d/w.

In some embodiments, the throw ratio is about 1.2:1, and is referred to in the present application as a conventional throw. For example, for a screen width of 2 m, a projector lens with a conventional throw can be at a distance of about 2.4 m from the screen.

In other embodiments, the throw ratio is about 0.45:1, and is referred to in the present application as a short throw. For example, for a screen width of 2 m, a projector lens with a short throw can be at a distance of about 90 cm from the screen.

In yet other embodiments, the throw ratio is about 0.25:1, and is referred to in the present application as an ultra-short throw. For example, for a screen width of 2 m, a projector lens with ultra-short throw can be at a distance of about 50 cm from the screen. A projector with an ultra-short throw can be positioned close to the screen (e.g., at a distance of between 10 cm and 70 cm from the screen for a typical range of screen dimensions).

In the above paragraphs, about means plus or minus five percent.

In some embodiments, a digital computer (e.g., a laptop, a tablet computer, smartphone, and/or other smart device) is communicatively coupled to the projector by a cable and/or by a wireless connection. In some embodiments, the digital computer is similarly located close to the screen. In other embodiments, the digital computer is located further away from the screen. In some embodiments, the digital computer is at a remote location.

Projection Systems

In some embodiments, the projection system includes a hard screen. In some embodiments, the projection system includes a soft screen. In some embodiments, the projection system includes a screen having a matte white viewing area with a black screen background to eliminate, or at least reduce, light penetration. In some embodiments, the screen can include black borders to improve the appearance of an image on the screen.

Some projection systems include a stand, e.g., a tripod with an upright pole. In at least some embodiments, the stand height is adjustable. In some embodiments, the stand can be foldable and/or is portable. In some embodiments, the projection system includes a cart for a projector. In some embodiments, the cart is a wheeled cart.

In some embodiments, the projection system includes a frame from which a projector can be suspended above the screen at a suitable distance from the screen.

An integrated projection system can include a screen, a stand or a cart, and a projector. A shortcoming of conventional integrated projection systems is that it can be difficult to adjust the height of the screen without affecting the geometry of the projector lens relative to the screen. Changes to the geometry of the projector lens relative to the screen can lead to a degradation of a projected image on the screen (e.g., poorer focus or lower brightness of the projected image).

In some embodiments, a projection system can use an ultra-short throw projection lens laser projector and a screen that includes a light-rejecting canvas. In some embodiments, the screen is an ambient light rejection (ALR) screen. In some embodiments, the ALR screen is a Parallax screen. In at least some embodiments, the ALR screen can reject light that is incident on the screen at selected angles of incidence, and preferentially reflect light that is incident on the screen from other angles. In operation, when an image is projected onto an ALR screen, the screen can have a similar appearance to a high definition television (HDTV) monitor.

In some embodiments of the projection system, the height of the screen can be adjusted to suit a ceiling height in a space (e.g., a meeting room) where the projection system is installed. In some embodiments, the projection system is a modular system, and the height of the screen can be adjusted by installing a shorter or a longer section of a vertical spine supporting the screen. In some embodiments, the height of the screen can be adjusted while leaving the throw unchanged.

In some embodiments, power cables and/or connecting cables for the projection system can be accommodated inside elements of the projection system. For example, in some embodiments, power cables and connecting cables can be accommodated in a spine of the projection system.

In some embodiments, the projection system uses a wireless connection for video/audio connectivity, e.g., a wireless High-Definition Multimedia Interface (HDMI) connection. In some embodiments, a wireless HDMI receiver can be placed alongside the projector, e.g., in a projector shroud. In some embodiments, wireless HDMI transmitter can be attached to a computer or video device transmitting video source data.

FIG. 1A is a front perspective view of projection system 100.

In some embodiments, projection system 100 can include projector 102 and screen 104. In some embodiments, projector 102 has an ultra-short throw projector lens. In some embodiments, screen 104 is an ALR screen. In some embodiments, projection system 100 further includes spine 106, base 108, and/or projector shroud 110.

In some embodiments, spine 106 comprises steel piping. In some embodiments, the steel piping can include a length (or multiple lengths) of steel pipe. In some embodiments the steel pipe has an outside diameter of 1 ½ inches (3.8 cm). In some embodiments, the steel piping can have threading on one end of the steel piping or on multiple ends of the steel piping.

In some embodiments, spine 106 can accommodate one or more cables. In some embodiments, cables can be accommodated, for example, in and/or around the steel piping of spine 106. In some embodiments, cables accommodated by spine 106 can include electrical cables that electrically communicatively couple elements of projection system 100 and/or provide power to elements of projection system 100.

In some embodiments, base 108 comprises a steel plate. The steel plate can include a threading suitable for receiving spine 106. In some embodiments, the threading suitable for receiving a steel pipe with an outside diameter of 1 ½ inches (3.8 cm). In some embodiments, base 108 includes a tripod. In some embodiments, projection system 100 includes a counterbalance (also referred to as a counterweight).

In some embodiments, projector shroud 110 is made, at least in part, of metal. In some embodiments, projector shroud 110 is made, at least in part, of steel. In some embodiments, projector shroud 110 comprises another suitable material, such as but not limited to wood and/or plastic. Projector shroud 110 can be used to hide projector 102 and associated cables (not shown in FIG. 1A). In some embodiments, projector shroud 110 can be used to protect projector 102 from the elements. In some embodiments projection system 100 can include a platform 112 (also referred to a shelf).

In some embodiments, projector shroud 110 is configured to increase ventilation and/or act as a heat sink. In some embodiments, projector shroud 110 and/or platform 112 are active heat sinks. In some embodiments, projection system 100 includes a fan located near projector shroud 110 and/or platform 112. In some embodiments, projector shroud 110 and/or platform 112 are passive heat sinks. In some embodiments, projector shroud 110 and/or platform 112 include various fin geometries.

In some embodiments, projector shroud 110 includes a remote-control extender such that projector shroud 110 does not interfere with remote control of projector 102.

In some embodiments, projection system 100 can further include a digital computer e.g., a laptop, a tablet, a computer, a smartphone, and/or other smart device. In some embodiments, the digital computer can be communicatively coupled to projector 102.

In some embodiments, the throw ratio of projection system 100 is under 0.6. In some embodiments, the throw ratio of projection system 100 is under 0.4. In some embodiments, the throw ratio of projection system 100 is under 0.25.

Figure 1B:
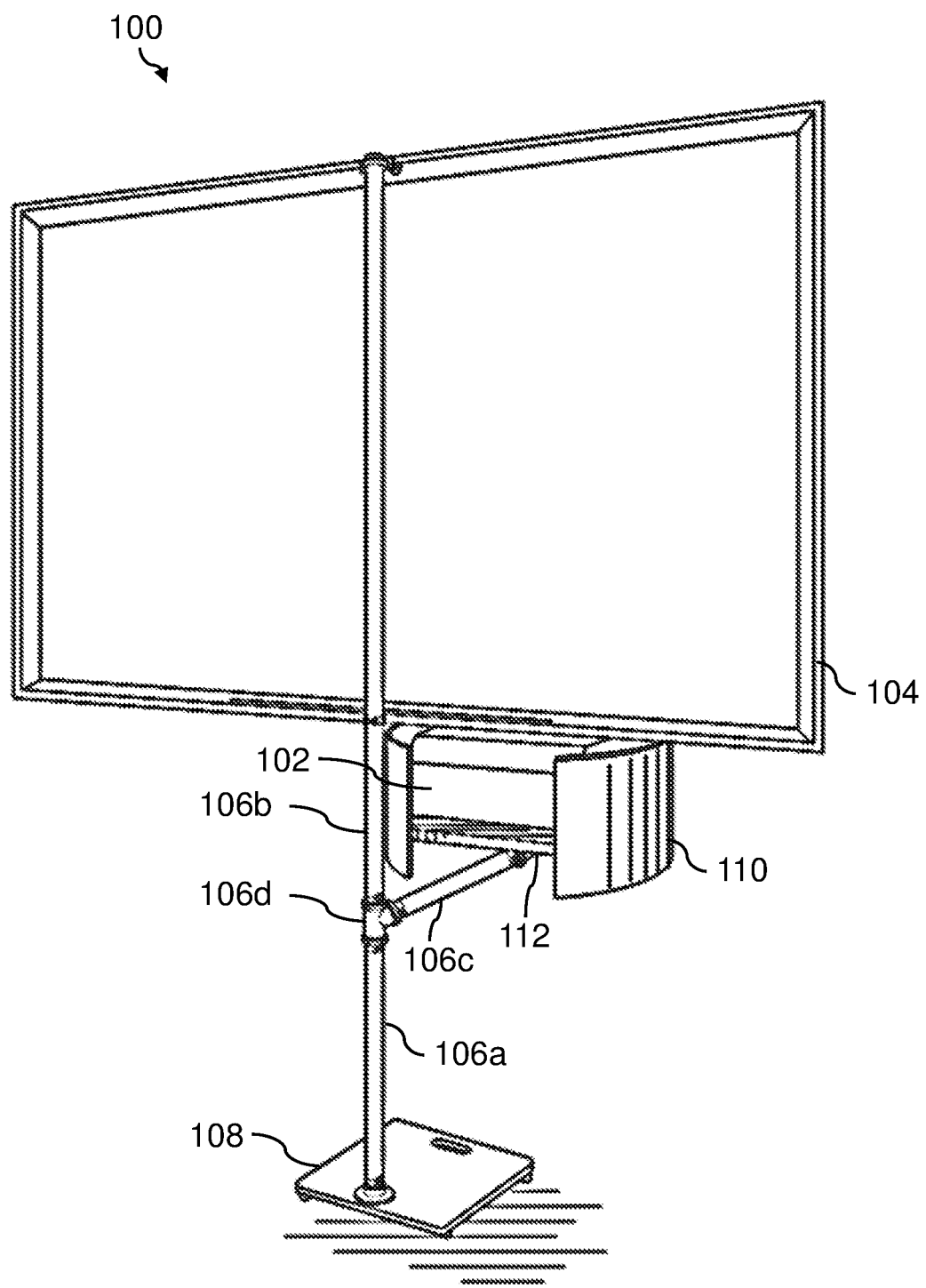
FIG. 1B is a back perspective view of the projection system of FIG. 1A.

FIG. 1B is a rear perspective view of projection system 100.

Projection system 100 can include platform 112 on which projector 102 can be placed within projector shroud 110. In some embodiments, platform 112 is ventilated and/or acts as a heat sink. In some embodiments, platform 112 includes a circular shelf. In some embodiments, platform 112 includes a wooden circular shelf with a receiving flange for an element of spine 106, e.g., a steel receiving flange suitable for receiving a steel pipe with an outside diameter of 1 ½ inches (3.8 cm).

In some embodiments, spine 106 is made up of lower leg 106a, upper leg 106b, arm 106c and/or mechanical tee connector 106d (also referred to as T-connector 106d). In some embodiments, as described with reference to FIG. 1A, spine 106 comprises steel piping. Each of lower leg 106a, upper leg 106b, and arm 106c can comprise a respective length of steel pipe with an outside diameter of 1 ½ inches (3.8 cm). T-connector 106d can comprise a 1 ½ inch (3.8 cm) steel T-connector.

Figure 1C:
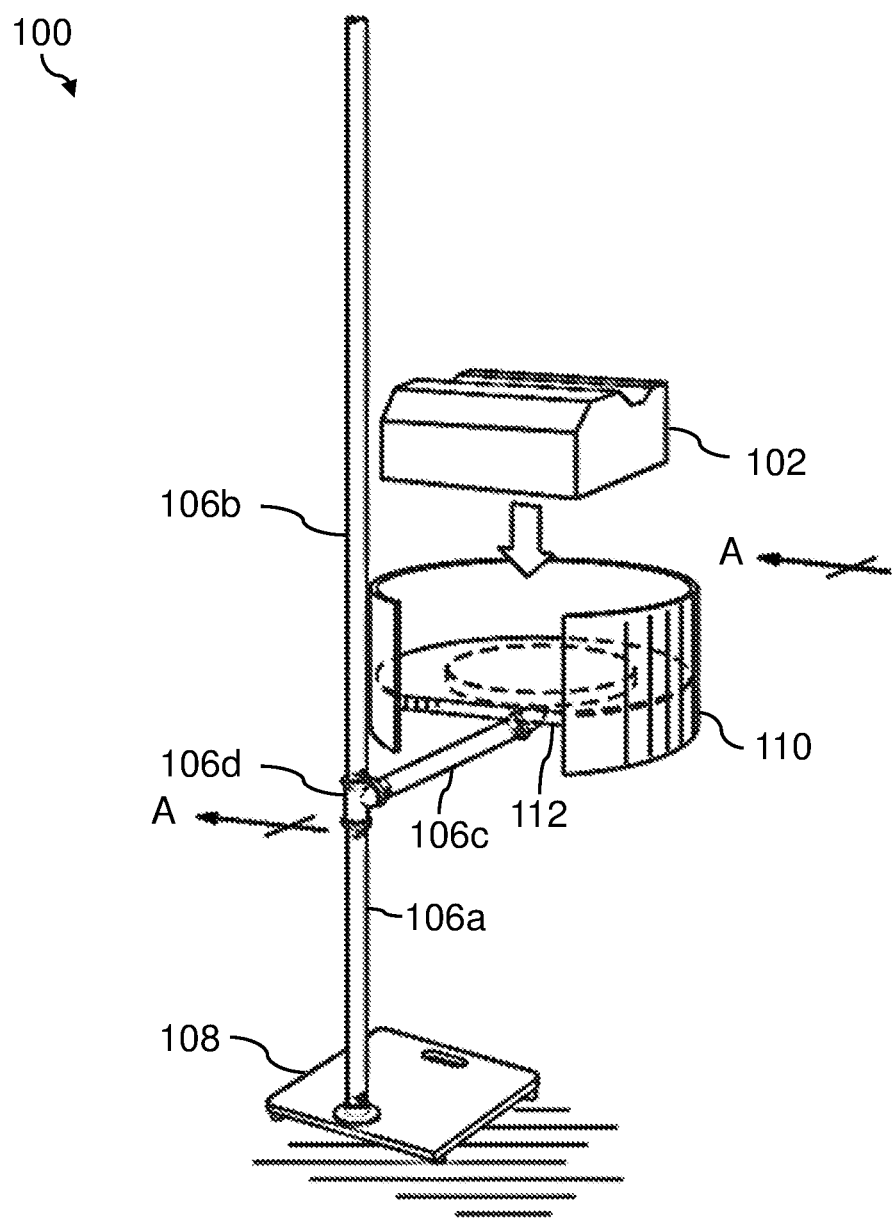
FIG. 1C is a back perspective view of a portion of the projection system of FIG. 1A showing placement of the projector on the platform.

FIG. 1C is a rear perspective view of projection system 100, showing placement of projector 102 on platform 112. For clarity, screen 104 of projection system 100 of FIG. 1A is not shown in FIG. 1C.

Figure 1D:
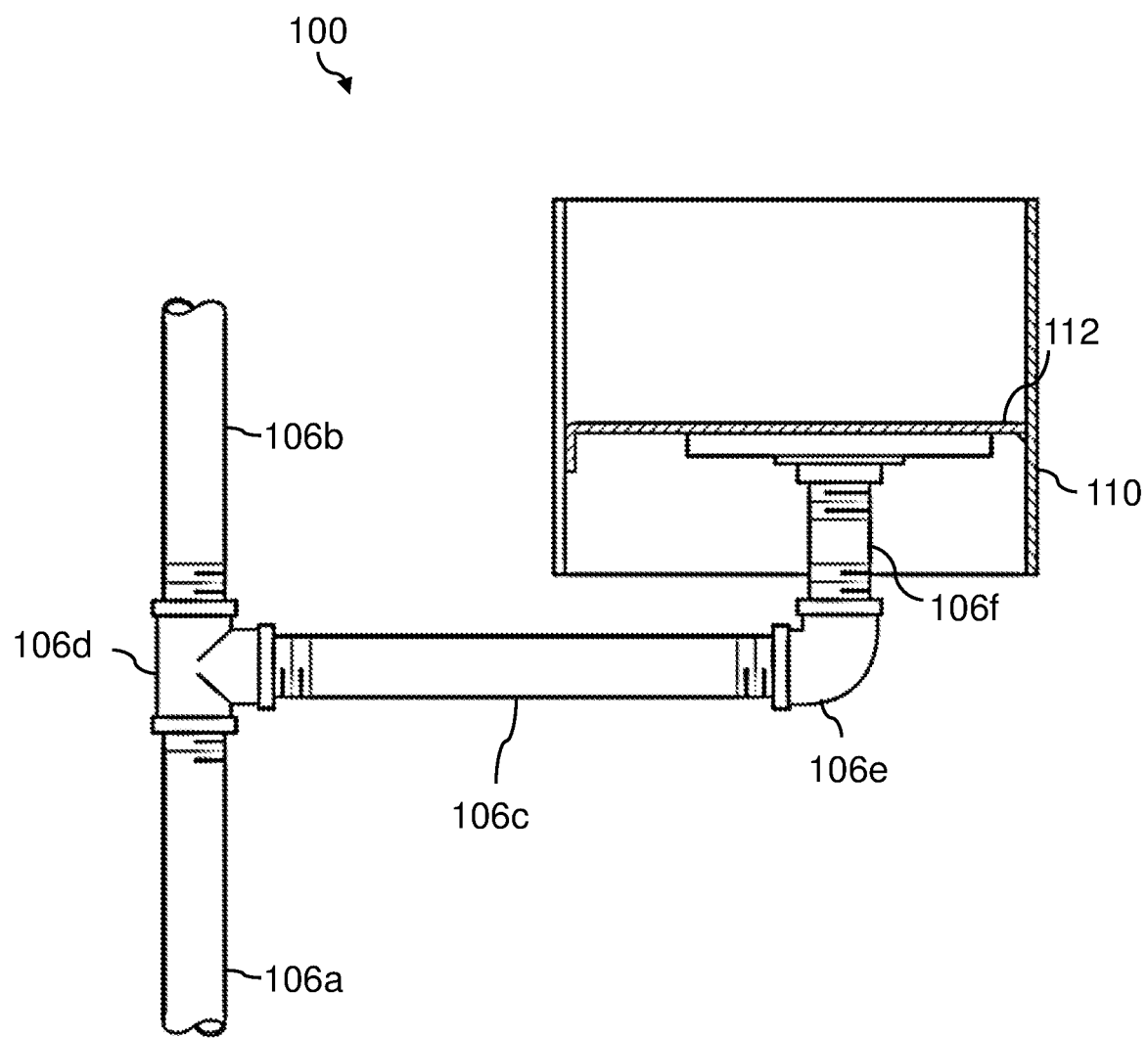
FIG. 1D is a cross-sectional view of a portion of the projection system of FIG. 1A.

FIG. 1D is a cross-sectional view of a portion of projection system 100 of FIG. 1A. The cross-section of view of FIG. 1D is indicated by the two arrows A of FIG. 1C.

In some embodiments, spine 106 of projection system 100 further includes corner connector 106e and/or platform support 106f.

In some embodiments, corner connector 106e is a 1 ½ inch (3.8 cm) 90-degree steel connector. In some embodiments, platform support 106f comprises a length of 1 ½ inch (3.8 cm) steel pipe threaded at both ends.

In some embodiments, at least some of the steel piping of spine 106 is encapsulated in 1 ½ inch (3.8 cm) black spandex pipe socks.

Lower leg 106a, upper leg 106b, arm 106c, T-connector 106d, corner connector 106e, and platform support 106f are collectively referred to as spine 106.

The length of lower leg 106a can be selected to provide a preferred overall screen height suitable for the space and the expected audience. In some embodiments, projection system 100 includes a set of interchangeable lower legs. In some embodiments, the set of interchangeable lower legs 106a includes three legs, each one having a different length (e.g., lengths of 24 inches (0.61 m), 36 inches (0.91 m), and 48 inches (1.22 m)). Regardless of the length of lower leg 106a, spine 106 and arm 106c remain in a desired geometry of the projector lens relative to the screen.

In some embodiments, the length of lower leg 106a is continuously adjustable. For example, lower leg 106a can include telescopic piping. In some embodiments, telescopic piping can be extended to a desired length and secured, for example, by one or more screws.

In some embodiments, the adjustment of lower leg 106a is motorized.

In some embodiments, the length of arm 106c is adjustable. In some embodiments, the length of upper leg 106b is adjustable.

In some embodiments, upper leg 106b and arm 106c are mechanically coupled such that an adjustment in the length of upper leg 106b causes a corresponding adjustment in the length of arm 106c (or vice versa) so as to maintain a desired geometry of the projector lens relative to the screen.

In some embodiments, T-connector 106d can slide along one of lower leg 106a and upper leg 106b, and can be secured, for example, by one or more screws.

Attachment of Screen

Figure 2:
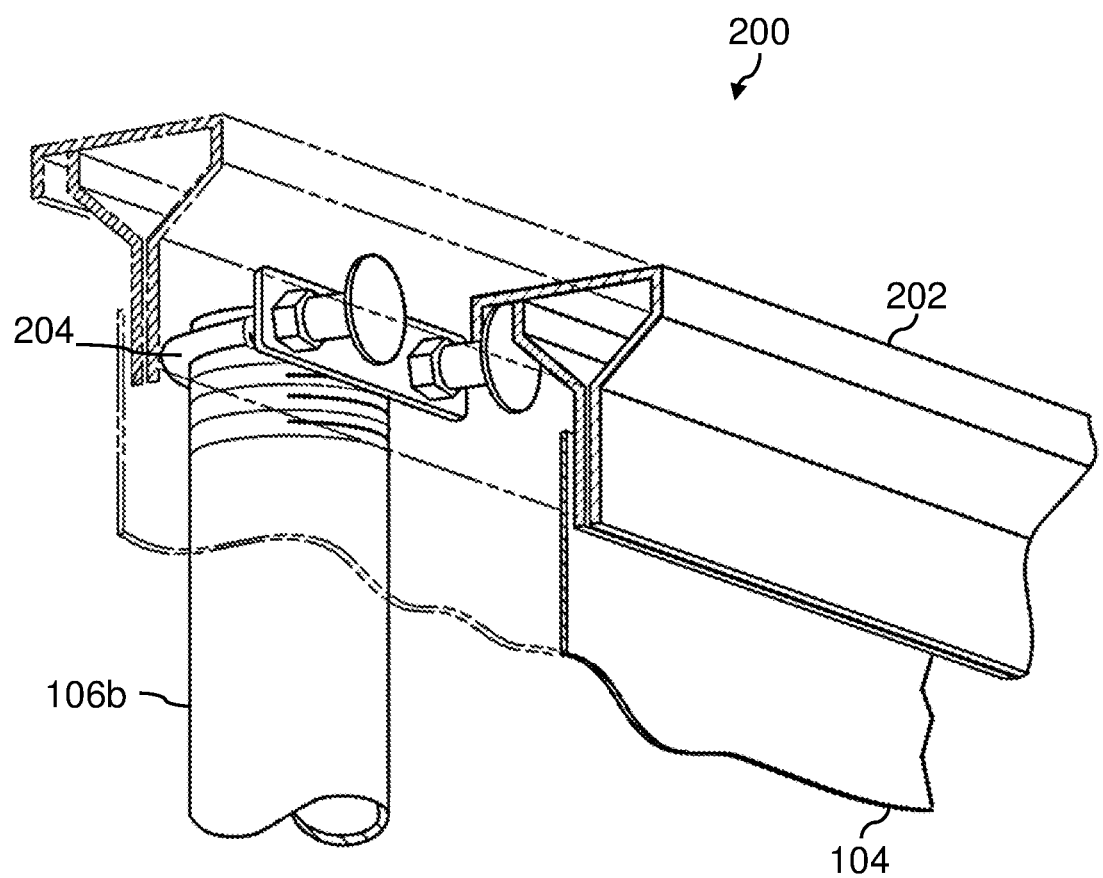
FIG. 2 is a partial sectional view of an attachment of the top of the screen to the upper leg of the spine of the projection system of FIG. 1A.

FIG. 2 is perspective drawing of attachment 200 of the top of screen 104 to upper leg 106b of spine 106 of projection system 100 of FIG. 1A.

In some embodiments, attachment 200 comprises upper frame member 202, and/or U-shaped bracket 204. In some embodiments, bracket 204 has brad hole ends. In some embodiments, upper frame member 202 sits on bracket 204. Other suitable attachments can be used.

Figure 3A:
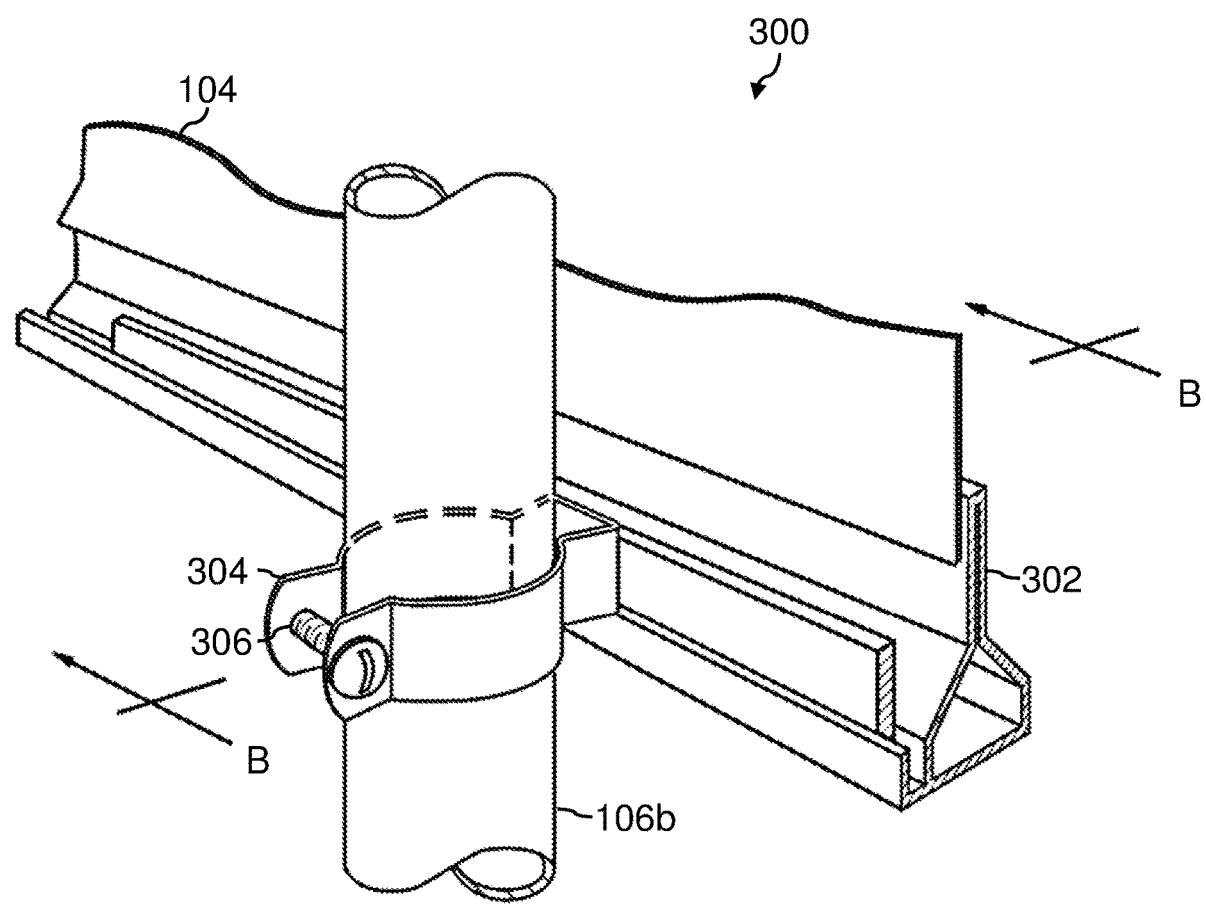
FIG. 3A is a perspective view of an attachment of the bottom of the screen to the upper leg of the spine of the projection system of FIG. 1A.

FIG. 3A is a perspective drawing of attachment 300 of the bottom of screen 104 to upper leg 106b of spine 106 of example projection system 100 of FIG. 1A. Elements in FIG. 3 labeled with the same numbers as in FIGS. 1A to 1D are similar, or even identical, to those described with reference to FIGS. 1A to 1D.

In some embodiments, attachment 300 comprises lower frame member 302, bracket 304, and/or screw 306. In some embodiments, screen 104 is attached to lower frame member 302. In some embodiments, lower frame member 302 is attached to upper leg 106b by bracket 304 and secured by screw 306. Other suitable attachments can be used.

Figure 3B:
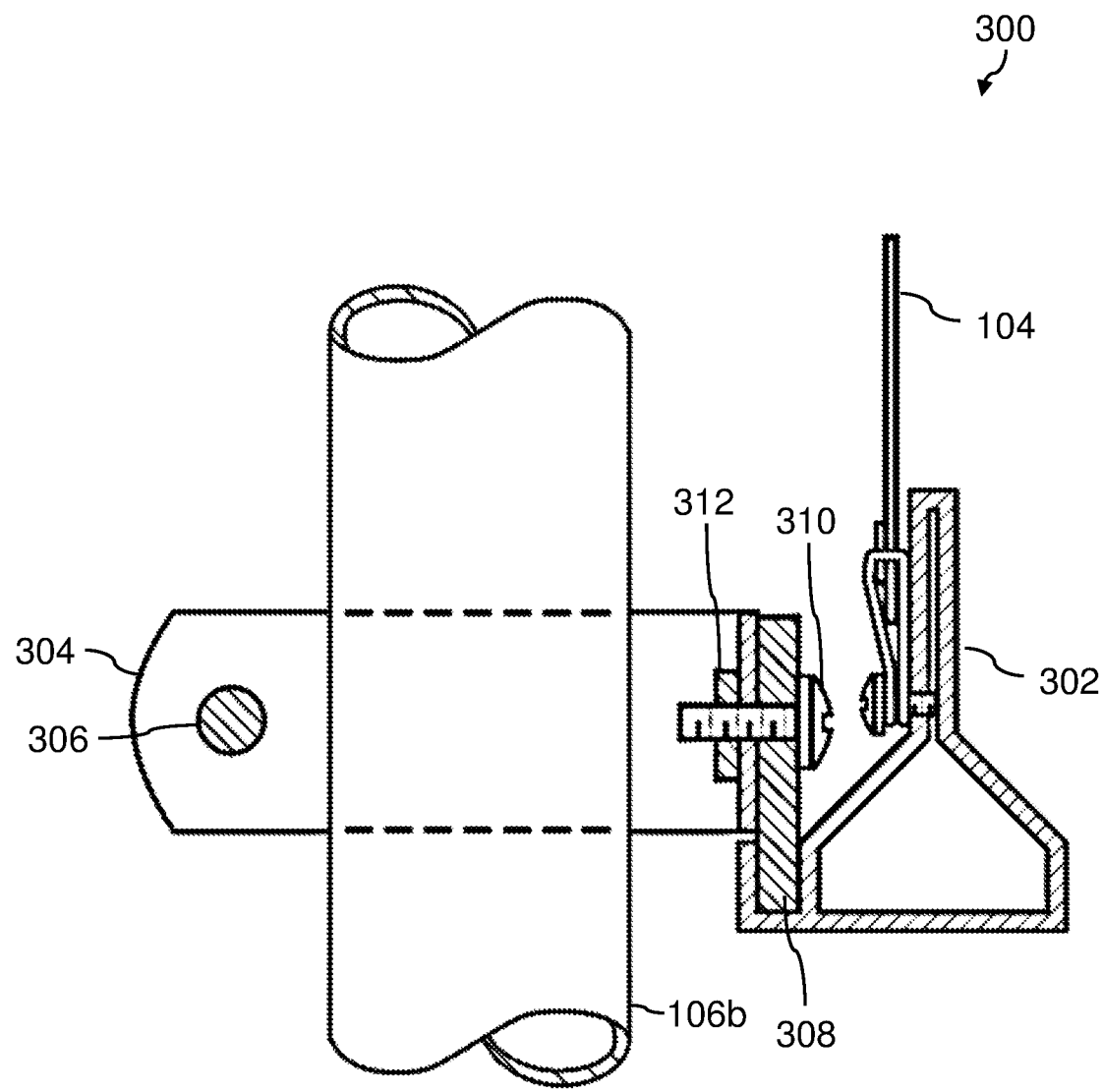
FIG. 3B is a cross-sectional view of the side of the attachment of FIG. 3A.

FIG. 3B is a cross-sectional view of example attachment 300 of FIG. 3A. The cross-sectional view of FIG. 3B is indicated by the two arrows B of FIG. 3A.

In some embodiments, a magnet is used at the bottom of the screen to stabilize the screen.

Figure 4:
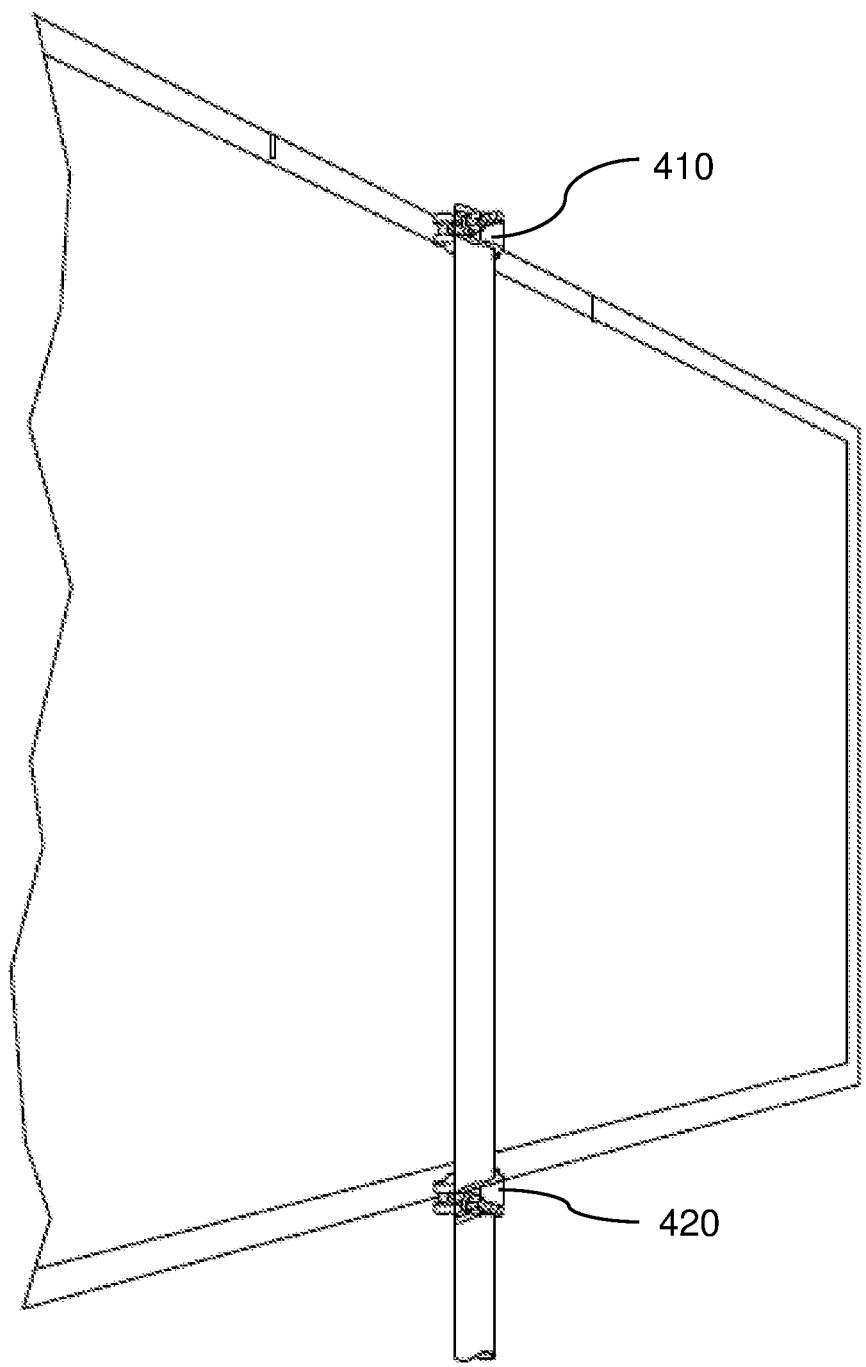
FIG. 4 is a back perspective view of a projection system utilizing an upper stabilizer and a lower stabilizer.
Figure 5A:
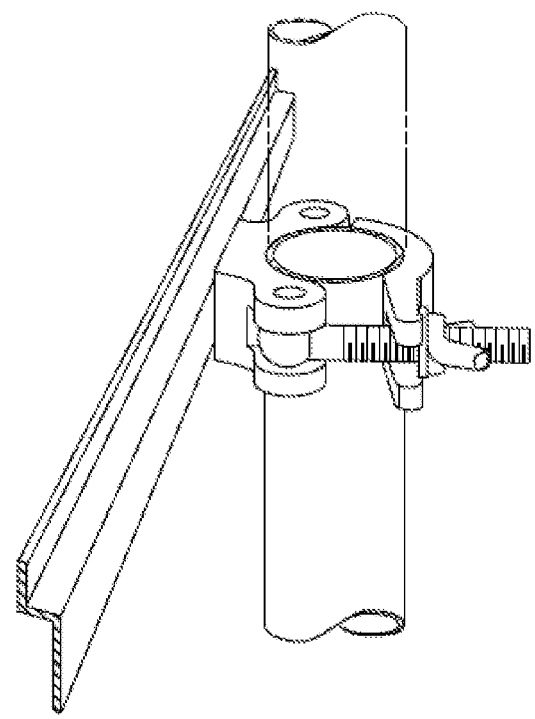
FIG. 5A is a front perspective view of a stabilizer.
Figure 5B:
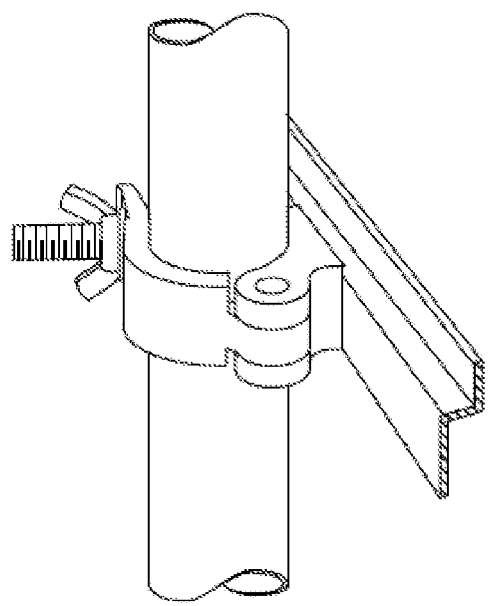
FIG. 5B is a back perspective view of a stabilizer.

In some embodiments, such as the one shown in FIG. 4, an upper stabilizer 410 and/or a lower stabilizer 420 can be used to stabilize the screen by providing horizontal support for the screen.

Applications

In some embodiments, projection system 100 can have the same, or at least similar, footprint as a flat-screen television on a stand. In at least some embodiments this provides a larger screen surface for less cost than a conventional HDTV for a system of comparable size.

In some embodiments projection system 100 can be disassembled, or at least partially disassembled, into its modular components for transportation or storage, for example. Unlike large HDTV systems, which are typically over 55 inches in size and require more than one person to place the TV on the stand, the modular components of the projection system can be assembled or re-assembled by a single person.

Advantages of the present technology can include a modular build, a smaller footprint with a larger screen size, ability to break down the device for easier storage, and/or cost savings relative to comparable conventional HDTV technology.

Particular elements and the configuration of those elements of the present technology as described in the above embodiments and embodiments can be incorporated into projection systems in other suitable combinations or arrangements, for example to suit particular applications.

While particular elements, embodiments, implementations, and applications of the present technology have been shown and described, it will be understood, that the technology is not limited thereto since modifications can be made without departing from the scope of the present disclosure, particularly in light of the foregoing teachings.

What is claimed is:

1. A modular projection system comprising:
   a) a projector with a lens;
   b) a screen;
   c) a spine comprising:
      i) an arm;
      ii) an upper leg configured to support said screen; and
      iii) a lower leg;
   d) a base configured to be placed on a floor and connect to said lower leg of said spine;
   e) a projector shroud configured to hide said projector from view; and
   f) a shelf configured to hold said projector,
      wherein said shelf is connected to said arm,
      wherein said shelf is located below said screen when said modular projection system is assembled,
      wherein said arm is configured to hold said shelf such that said lens is located at a given horizontal distance from said screen,
      wherein said screen has a width,
      wherein the ratio of said given horizontal distance to said width is under 0.6.

2. The modular projection system of claim 1 wherein said spine is made of steel piping.

3. The modular projection system of claim 1 wherein said spine is hollow and can accommodate a first cable.

4. The modular projection system of claim 1 wherein said screen is an ALR screen.

5. The modular projection system of claim 1 wherein said projector uses an ultra-short throw projector lens.

6. The modular projection system of claim 1 wherein said base is a steel plate.

7. The modular projection system of claim 1 wherein said projector shroud is configured to increase ventilation and/or act as a heat sink.

8. The modular projection system of claim 1 wherein said shelf is configured to increase ventilation and/or act as a heat sink.

9. The modular projection system of claim 1 wherein said ratio of said given horizontal distance to said width is under 0.4.

10. The modular projection system of claim 9 wherein said lower leg is telescoping lower leg.

11. The modular projection system of claim 1 wherein said modular projection system further comprises a set of lower legs, wherein said set includes at least said lower leg and a second lower leg, wherein the length of said lower leg is different than the length of said second lower leg, wherein said lower leg or said second lower leg are used to make up part of said spine.

12. The modular projection system of claim 1 wherein the length of said arm is adjustable.

13. The modular projection system of claim 1 wherein the length of said upper leg is adjustable.

14. The modular projection system of claim 1 further comprising a T-connector wherein said T-connector is connected to said arm, said upper leg, and said lower leg.

15. A modular projection system comprising:
   a) a projector, wherein said projector uses an ultra-short throw projector lens;
   b) an ALR screen;
   c) a spine, wherein said spine is hollow and can accommodate a first cable;
   d) a base configured to be placed on a horizontal surface;
   e) a projector shroud configured to hide said projector from view; and
   f) a shelf configured to hold said projector,
      wherein said shelf is located below said ALR screen when said modular projection system is assembled,
      wherein said spine comprises an arm to hold said shelf such that said ultra-short throw projector lens is located at a given horizontal distance from said ALR screen,
      wherein said ALR screen has a width,
      wherein said ratio of said given horizontal distance to said width is under 0.4.

16. The modular projection system of claim 15 wherein said modular projection system further comprises a set of lower legs, wherein said set includes at least a first lower leg and a second lower leg, wherein the length of said first lower leg is different than the length of said second lower leg, wherein said first lower leg or said second lower leg are used to make up part of said spine.

17. The modular projection system of claim 15 wherein said projector shroud is configured to increase ventilation and/or act as a heat sink.

18. The modular projection system of claim 15 wherein said shelf is configured to increase ventilation and/or act as a heat sink.

* * * * *